United States Patent Office 3,761,306
Patented Sept. 25, 1973

3,761,306
PROCESS FOR MANUFACTURING A
TERNARY MATERIAL
Tohru Hara and Ichiro Asao, Kadoma, Japan, assignors
to Matsushita Electric Industrial Company, Limited,
Osaka, Japan
Filed Jan. 25, 1971, Ser. No. 109,285
Claims priority, application Japan, Jan. 30, 1970,
45/8,778; Dec. 29, 1970, 46/124,699, 46/124,724,
46/124,823
Int. Cl. C23c 11/00, 13/00
U.S. Cl. 117—106 A
9 Claims

ABSTRACT OF THE DISCLOSURE

A process of depositing unto a substrate a film of a ternary alloy material such as $GaAs_{1-x}P_x$ containing first, second and third elements selected from the group consisting of elements from the IIIa and Va columns of the Periodic Table, the second and third elements being selected from the same column and the proportions of the second and third elements being varied in a direction which, comprises preparing a halide of one out of the second and third elements carried by a hydrogen gas, reacting the halide with the hydrogen gas at a first temperature which is varied in the range between 0° C. and 900° C., cooling the resultant vapour to room temperature, reacting the cooled vapour with a source material containing a compound of the first element and the other of the second and third elements at a second temperature, and evaporating the resultant vapour onto a suitable substrate maintained at a third temperature which is below the second temperature.

---

This invention relates to a process of manufacturing a ternary material and more particularly to a process of growing a ternary material, the ratio or proportion of the two components of which vary complementarily in the direction of growth.

In general, there are different known methods for manufacturing a ternary material containing three elements selected from the group consisting of elements from the third and fifth columns of the Periodic Table as set forth in the Handbook of Chemistry and Physics (CR Co) 1971 ed. Two out of the three elements are selected from the same column and are contained in the ternary material with concentrations varying complementarily. An example of such ternary material is $GaAs_{1-x}P_x$, where $0 \leq X \leq 1$.

In a typical known method, a starting gaseous mixture of gallium (Ga), arsenic (As) and phosphor or phosphorus (P) is applied and evaporated and deposited onto a substrate of gallium arsenide (GaAs) or gallium phosphide (GaP) at a high temperature. The desired proportion of the arsenic to phosphor components of the resultant material is achieved by changing the proportions of the arsenic (As) and phosphor (P) of the starting mixture by regulating the respective flow rates of the As and P gases. However, difficulty is encountered in automatically controlling the flow rates of the As and P gases.

Accordingly, it is an object of this invention to provide a new and improved method for producing a ternary material containing three elements selected from the group consisting of elements selected from the IIIa and Va columns of the Periodic Table, two of the three elements being selected from the same column.

Another object of this invention is to provide a new and improved method for manufacturing a ternary material containing two elements the concentrations of which vary complementarily in the direction of growth.

Still another object of this invention is to provide a new and improved method for manufacturing a ternary material in an automatic fashion.

Still another object of this invention is to provide a new and improved method for manufacturing a ternary material expressed by $GaAs_{1-x}P_x$.

Still further object of this invention is to provide a new and improved method for manufacturing GaP.

Figure 1:
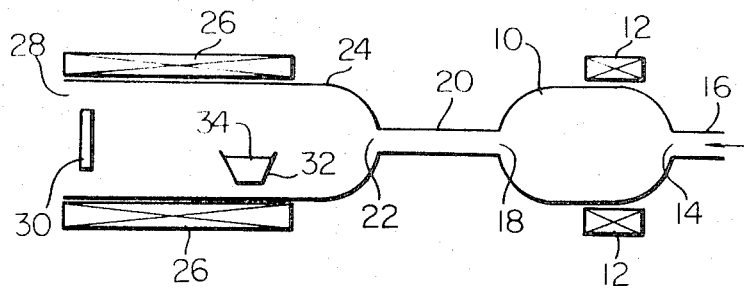
Figure 2:
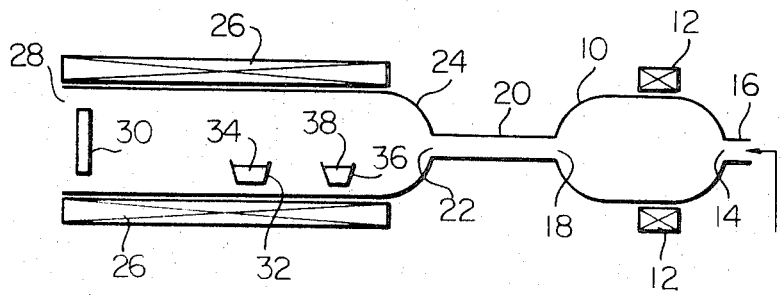
Figure 3:
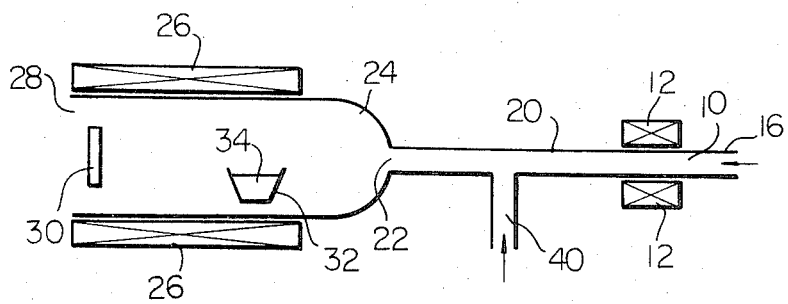

In the drawing, FIGS. 1 to 3 are views illustrating apparatus used for manufacturing and depositing a ternary material such as $GaAs_{1-x}P_x$.

In FIG. 1 an apparatus for growing a ternary crystal on a substrate is shown which comprises a first reaction chamber or zone 10 surrounded by a first heating coil 12 and having at one end an inlet 14 connected to a first conduit 16 through which a starting gaseous mixture is introduced into the chamber 10. The first reaction chamber 10 has at the other end an outlet 18 connected through a second conduit or second zone 20 to an inlet 22 of a second reaction chamber 24. The second chamber 24 is surrounded by a second heating coil 26 and has an outlet or fourth zone 28 near which a substrate 30 of a suitable material is disposed. A container or third zone 32 is positioned anywhere between the inlet 22 and the substrate 30. The container 32 carries a suitable source material 34 containing components to be evaporated and deposited onto the substrate 30.

Phosphor chloride gas ($PCl_3$) carried by a hydrogen gas ($H_2$) is supplied through the conduit 16 to the first chamber 10. The temperature $T_1$ in the chamber 10 is regulated by the first heating coil 12. In the first chamber 10, the $PCl_3$ is reacted with the $H_2$ according to the following formula:

$$2PCl_3 + 3H_2 \rightleftharpoons 6HCl + \tfrac{1}{2}P_4 \qquad (1)$$ 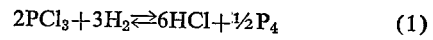

wherein the position of the equilibrium is shifted to the right when the temperature $T_1$ is raised. Therefore, the higher the temperature $T_1$, the greater the amount of $PCl_3$ reacts with the $H_2$. In other words, the stoichiometrical amount of the $PCl_3$ is a function of the temperature $T_1$.

In this instance, if the temperature $T_1$ is not high enough to permit the $PCl_3$ and $H_2$ vapours to unite completely to form the HCl and $P_4$ vapours, then a mixture of $PCl_3$, $H_2$, HCl and $P_4$ vapours is introduced into the second conduit 20.

The temperature in the second conduit 20 is maintained at about a room temperature so that the mixture introduced thereinto is cooled, with the result that the $P_4$ component is deposited onto the inner wall of the second conduit 20. Therefore, the rest of the mixture in the second conduit 20 is introduced into the second reaction chamber 24. The ratio $PCl_3$ vapour to HCl vapour introduced into the second chamber 24 is varied dependent upon the temperature $T_1$.

Since the temperature $T_2$ in the vicinity of the container 32 carrying the GaAs as a source material is maintained sufficiently high, the HCl component of the mixture is reacted with the GaAs according to the following formula:

$$2GaAs + 2HCl \rightleftharpoons 2GaCl + H_2 + \tfrac{1}{2} \cdot As_4 \qquad (2)$$ 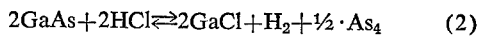

wherein the position of the equilibrium is shifted to the right when the temperature $T_2$ is raised. The GaCl and $As_4$ vapours produced in the above relation are deposited onto the substrate 30. The temperature $T_3$ of the substrate 30 is maintained below the temperature $T_2$ so that gallium arsenide (GaAs is deposited onto the substrate 30 according to the following formula:

$$3GaCl + \tfrac{1}{2}As_4 \rightleftharpoons GaCl_3 + 2GaAs \qquad (3)$$ 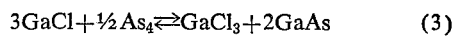

wherein the point of equilibrium is shifted to the right when the ambient temperature is lowered.

Concurrently, the $PCl_3$ and $H_2$ vapours in the second chamber 24 react with each other to form phosphor vapour $P_4$ according to the Formula 1. The thus produced phosphor vapour $P_4$ impinges onto the substrate 30 and then gallium phosphide (GaP) is deposited onto the substrate according to the following formula:

$$3GaCl + \tfrac{1}{2}P_4 \rightleftarrows GaCl_3 + 2GaP \quad (4)$$

wherein the point of equilibrium is shifted to the left when the ambient temperature is lowered.

Here, it should be noted that the ratios of the $PCl_3$ to HCl vapour components of the mixture entering the second chamber 24 is dependent on the temperature $T_1$ of the first reaction chamber 10, provided that the supply rate of the $PCl_3$ is maintained constant. Hence, the ratio of the $P_4$ to $As_4$ vapours are dependent on the temperature $T_1$ and thus the ratio of the phosphor (P) and arsenic (As) evaporated onto the substrate according to the Formulas 3 and 4 are dependent upon the temperature $T_1$. Therefore, changing and controlling the temperature $T_1$ during the evaporation of the As and P onto the substrate 30 results in growing a ternary material on the substrate 30 which contains As and P in concentrations varied complementarily in the direction of growth of the ternary material represented by $GaAs_{1-x}P_x$.

If desired, the temperature $T_1$ is controlled by a computer in consideration of the growth rate of the resulting ternary material and the thermal capacity of the first chamber 10.

In this instance, it should be noted that the concentration of the As is greater than that of the P of the resultant ternary material because, when the $P_4$ vapour is produced according to the Formula 1, the HCl is simultaneously produced which reacts with the GaAs in the container 32 according to the Formula 2 so as to form $As_4$ vapour.

As a result, where a GaAs substrate, GaAs single- or poly-crystals and a $PCl_3$ vapour carried by $H_2$ gas are used as materials of the substrate 30, the source material 34 and the starting gaseous mixture respectively and where the temperature $T_1$ is gradually decreased from one temperature level to another temperature level $GaAs_{1-x}P_x$ is obtained on the substrate 30 where the value $x$ is varied from 0 to about 0.5 in the direction of growth.

If, on the other hand, a GaP plate as substrate, GaAs single- or poly-crystals as source material, and a $PCl_3$ vapour as starting material are used and the temperature $T_1$ is increased from the minimum point to the maximum $GaAs_{1-x}P_x$ is obtained, the value $x$ being varied from 0.5 to 0 in the direction of growth.

If an $AsCl_3$ vapour carried by $H_2$ gas instead of the $PCl_3$ vapour carried by $H_2$ gas is used for the starting mixture, the $AsCl_3$ and the $H_2$ are reacted with each other in the first chamber 10 according to $$2AsCl_3 + 3H_2 \rightleftarrows 6HCl + \tfrac{1}{2}As_4 \quad (5)$$

wherein the point of the equilibrium is shifted to the right when the temperature $T_1$ is raised. In this instance, where a GaAs plate and GaP single- or poly-crystals are used respectively as materials of the substrate 30 and the source material 34 and, where the temperature $T_1$ is gradually decreased from the maximum point to the minimum, $GaAs_{1-x}P_x$ is obtained, where the value $x$ is varied from 1.0 to 0.5 in the direction of growth. The maximum and the minimum temperatures are selected so as to suit the purpose that the forward reaction of the Formulas 1 and 5 be complete at the maximum temperature and that the reaction substantially does not take place at the minimum temperature.

EXAMPLE I

The minimum point of the temperature $T_1$ was set below the room temperature and the maximum point at about 800° C. The temperature $T_2$ was 950° C. and the temperature $T_3$ was about 800° C. The feed rate of $PCl_3$ was $1 \times 10^{-5}$ mol/min. and the flow rate of $H_2$ was 200 cc./min.

EXAMPLE II

The temperatures $T_1$, $T_2$ and $T_3$ were set at the same points as in Example I. The feed rate of $AsCl_3$ was $1 \times 10^{-5}$ mol/min. and the flow rate of $H_2$ was 200 cc./min.

Another preferred example of the methods of this invention will now be described. This example is adapted to obtain $GaAs_{1-x}P_x$ where the value $x$ can be varied from 0 to 1 once the apparatus of FIG. 1 is conditioned. It is important to use GaAs and Ga crystals as the source material 34 carried by the container 32 in the second chamber 24. As the starting gaseous mixture is $PCl_3$ which is carried by $H_2$ gas and as the substrate is GaAs plate. The starting gaseous mixture is supplied through the conduit to the first chamber 10, the temperature $T_1$ of which is lowered from the maximum point to the minimum. In this instance, the amount of GaAs crystals is previously adjusted so as to complete its reaction with the gaseous mixture within the second chamber 24 just at the time when the temperature $T_1$ is lowered to the minimum.

Described in more detail, the mixture of $PCl_3$ and $H_2$ vapours is supplied through the first conduit 16 into the first chamber 10 in which the $PCl_3$ and $H_2$ vapours react with each other to form $P_4$ and HCl according to the Formula 1. Thereafter, the gaseous mixture is introduced into the second conduit 20 wherein the $P_4$ vapour is condensed onto the inner wall of the second conduit. The gaseous mixture which is now void of the $P_4$ component is introduced into the second reaction chamber 24 wherein the gaseous mixture is subjected to temperature $T_2$ so that the HCl reacts with the Ga crystals of a material source, viz, $$2Ga + 2HCl \rightleftarrows 2GaCl + H_2 \quad (6)$$

Concurrently, the reaction in compliance with Formula 1 takes place in the second chamber 24 to form a $P_4$ vapour, so that both the GaP and GaAs are condensed onto the substrate at further increased rates according to the Formulas 3 and 4. On the other hand, the temperature $T_1$ is lowered from the maximum point toward the minimum so that the $P_4$ vapour is increased in quantity while the $As_4$ vapour is decreased due to consumption of the GaAs crystals of another source material. Finally, the GaAs source material is fully consumed when the temperature $T_1$ is reduced to the minimum point. In this manner, $GaAs_{1-x}P_x$ is grown on the substrate, where the value $x$ is varied from 0 to 1 in the direction of growth. If the final condition is maintained for some time, gallium phosphide (GaP) will be obtaned on the $GaAs_{1-x}P_x$ layer.

The thus obtained GaP is advantageous for its large size and decreased number of lattice defects.

EXAMPLE III

The temperature $T_1$ was gradually decreased from about 800° C. to 0° C. during 2 hours and the temperatures $T_2$ and $T_3$ were set at the same points as in Example I. About 25 g. Ga and about 2 g. GaAs are used for the source materials. The resultant material $$GaAs_{1-x}P_x$$

was obtained where the value $x$ was from 0 to 1.

The method, hereinbefore discussed, may be modified to obtain such a $GaAs_{1-x}P_x$ and GaP as produced by preparing the Ga source material in addition to the GaAs source material, an apparatus adapted for the purpose being shown in FIG. 2.

The apparatus of FIG. 2 has in its second chamber a source apparatus of FIG. 1 and, therefore, the corresponding parts are similarly numbered.

A starting mixture containing $PCl_3$ and $H_2$ vapours is introduced into a first chamber or zone 10 through a conduit 16. The starting gas is caused to react in the same manner as described and delivered into the second chamber 24. In this instance, the temperature $T_2$ in the vicinity of the container or fourth zone 34 carrying the GaAs crystals is maintained at a temperature high enough to produce the forward reaction of the Formula 2, while the temperature $T_4$ of an additional container 36 carrying the Ga crystals is initially too low to cause the forward reaction of the Formula 6. On the other hand, when the temperature $T_1$ in the first chamber 10 is decreased to 0° C. and, the temperature $T_4$ is concurrently raised to a temperature, say about 950° C. for example, under which condition the forward reaction of the Formula 1 is completed and a film of ternary alloy material is deposited onto a substrate 30 located in the fourth zone maintained at a temperature of 800° C. Therefore, the proportion of $P_4$ to $As_4$ vapours is gradually increased and some time after the temperature $T_4$ is raised that proportion becomes 1 since the GaAs source is consumed because of its prelimited amount.

It should be noted that GaP having a desired thickness can be obtained on the $GaAs_{1-x}P_x$ by continuing to supply the starting gaseous mixture and maintaining the temperatures even after the GaAs source material is consumed. The so produced GaP is large in size and has a decreased number of lattice defects. It may also be mentioned that the thickness of the GaP can be selected readily where this method is put into practice.

Still another example of the method according to this invention is hereinbelow described with reference to FIG. 3. An apparatus of FIG. 3 comprises a first tubular reaction chamber or first zone 10 surrounded by a first heating coil 12 and having an inlet 14 connected to a first conduit 16. The first chamber 10 is connected through a second conduit or second zone 20 to an inlet 22 of a second reaction chamber 24. The second conduit 20 is connected to a third conduit 40 at its intermediate portion between the first and second reaction chambers 10 and 24, respectively. The second chamber 24 is surrounded by a second heating coil 26 and has outlet or fourth zone 28 near which a substrate 30 is positioned. A container or third zone 32 carrying a source material 34 is positioned anywhere between the inlet 22 and the substrate 30.

As the substrate 30 and the source material 34 are used GaAs single-crystals and Ga single- or poly-crystals, respectively. In this case, a $PCl_3$ vapour carried by $H_2$ vapour is supplied through the first conduit 16 to the first reaction chamber 10 as a gaseous starting material. In the first chamber 10 the reaction of the Formula 1 between $PCl_3$ and $H_2$ takes place at the temperature $T_1$ of the first chamber 10 and results in producing $P_4$ and HCl vapours. Then, the mixture containing $PCl_3$, $H_2$, $P_4$ and HCl is introduced into the second conduit 20 which is maintained at a room temperature so that the $P_4$ vapour is condensed onto the inner wall of the second conduit 20. On the other hand, the $AsCl_3$ vapour carried by $H_2$ gas supplied to the second conduit 20 through the third conduit 40 so that a mixture containing $AsCl_3$, $H_2$ and $PCl_3$ is delivered to the second reaction chamber 24.

Since the temperature $T_2$ in the vicinity of the container 32 is maintained sufficiently high, the HCl component of the delivered mixture is caused to react with the source material Ga according to the Formula 6 so as to produce GaCl and $H_2$. Concurrently, the $AsCl_3$ reacts with the $H_2$ at the temperature $T_2$ according to the Formula 5. The thus produced GaCl is applied to the substrate with the $As_4$ and $P_4$ and condensed onto the substrate according to the Formulas 3 and 4 because the temperature $T_3$ of the substrate is maintained below the temperature $T_2$.

In this instance, reduction of the temperature $T_1$ in the first chamber 10 from the maximum point to the minimum results in growing $GaAs_{1-x}P_x$, the value $x$ being varied from 0 to 0.5 in the direction of growth.

If preferred, the $PCl_3$ and $AsCl_3$ may be substituted for each other and the temperature $T_1$ may be increased from the minimum to the maximum so as to obtain another material $GaAs_{1-x}P_x$, the value $x$ being varied from 0.5 to 1 in the direction of growth.

Otherwise, where a GaAs single-crystal plate is used for the substrate 30 and the temperature $T_1$ is lowered from the maximum point to the minimum, $GaAs_{1-x}P_x$ will be grown on the substrate 30, the value $x$ being varied from 1 to 0.5 in the direction of growth.

Furthermore, if it is desired to obtain $GaAs_{1-x}P_x$ wherein the value $x$ is varied from 0.5 to 1, a GaP plate may be used for the substrate 30 and $PCl_{30}$ and $AsCl_3$ vapours are respectively applied through the first and the third conduits 16 and 40, while the temperature $T_1$ may be varied from the minimum point to maximum.

It is apparent that the methods described hereinabove according to this invention may be applied for the manufacture of the other ternary materials such as:

$Ga_xAl_{1-x}Sb$; $Ga_xAl_{1-x}As$; or $Al_xGa_{1-x}P$

What is claimed is:

1. A process of manufacturing a ternary material containing first, second and third elements selected from the group consisting of elements from the IIIa and Va columns of the Periodic Table, said second and third elements being selected from the same column and the proportions of said second and third elements being varied in the direction of growth of said ternary material, comprising introducing a gaseous mixture of hydrogen and a halide of one of said second and third elements into a first zone maintained at variable first temperatures to produce reactants, reacting said halide with said hydrogen gas at a first temperature in said first zone, to form vaporous reaction products, cooling the resultant vapour, in a second zone, reacting the cooled vapour in a third zone with a source material containing a compound consisting of said first element and the other of said second and third elements at a second temperature, evaporating and reacting said source material with said resultant reaction products in said third zone, depositing said ternary material from the resultant vapour onto a suitable substrate in a fourth zone at a third temperature which is below said second temperature, and while introducing said halide with said hydrogen in said first zone, varying said first temperature to effect a variation in the proportions of produced reactants entering said second zone thereby varying the proportions of said second and third elements in the direction of growth of said ternary material.

2. A process of depositing onto a substrate a ternary material containing first, second and third elements selected from the group consisting of elements from the IIIa and Va columns of the Periodic Table, said second and third elements being selected from the same column and the proportions of said second and third elements being varied in the direction of growth of said ternary material, said process comprising the steps of:

introducing a gaseous mixture of hydrogen and a halide of one of said second and third elements into a first zone controlled at a first temperature to produce reactants;

cooling said reactants by passage through a second zone maintained at room temperature;

introducing said reactants into a third zone maintained at a second temperature, said third zone containing a source material comprising a compound consisting of said first element and one of said second and third elements;

evaporating said source material and reacting it with said reactants; and depositing said ternary material onto said substance in a fourth zone at a third temperature which is below said second temperature; and while introducing said gaseous mixture into said first zone, varying said first temperature in a range to effect a variation in the proportions of said reactants entering said second zone thereby varying the proportions of said second and third elements in the direction of growth of said ternary material.

3. A process as claimed in claim 2, wherein said first temperature is varied through a temperature range substantially from 900° to 0° C., said second temperature is 900° to 950° C. and said third temperature is 750° to 800° C.

4. A process of depositing onto a substrate a ternary material containing first, second and third elements selected from the group consisting of elements from the IIIa and Va columns of the Periodic Table, said second and third elements being selected from the same column and the proportions of said second and third elements being varied in the direction of growth of said ternary material, said process comprising the steps of:
  introducing a gaseous mixture of hydrogen and a halide of one of said second and third elements into a first zone at a first temperature maintained to produce reactants;
  cooling said reactants by passage through a second zone maintained at room temperature;
  introducing a halide of one of said second and third elements into said second zone;
  introducing said reactants and introduced halide into a third zone at a second temperature, said third zone containing a source material comprising said first element;
  evaporating and reacting said source material; and
  depositing said ternary material onto said substrate provided in a fourth zone at a third temperature which is below said second temperature, and while introducing said gaseous mixture into said first zone, varying said first temperature in a range to effect a variation in the proportions of said reactants entering said second zone thereby varying the proportions of said second and third elements in the direction of growth of said ternary material.

5. A process as claimed in claim 4, wherein said first temperature is varied through a range from about 800° C. to about 0° C., said second temperature is substantially 950° C. and said third temperature is substantially 800° C.

6. A process of depositing onto a substrate a ternary material containing first, second and third elements selected from the group consisting of elements from the IIIa and Va columns of the Periodic Table, said second and third elements being selected from the same column and the proportions of said second and third elements being varied in the direction of growth of said ternary material, said process comprising the steps of:
  introducing a gaseous mixture of hydrogen and a halide of one of said second and third elements into a first zone at a first temperature to produce reactants;
  cooling said reactants by passage through a second zone maintained at room temperature;
  introducing said reactants into a third zone at a second temperature, said third zone containing a first source material consisting of said first element and a second source material containing a compound consisting of said first element and one of said second and third elements;
  evaporating said first and second source materials and reacting same with said reactants; and
  depositing said ternary material onto said substrate provided in a fourth zone at a third temperature which is below said second temperature, and while introducing said gaseous mixture into said first zone, varying said first temperature in a range to effect a variation in the proportions of said reactants entering said second zone thereby varying the proportions of said second and third elements in the direction of growth of said ternary material.

7. A process as claimed in claim 6, wherein said first temperature is varied through a range from about 800° C. to about 0° C., said second temperature is substantially 950° C. and said third temperature is substantially 800° C.

8. A process of depositing onto a substrate a ternary alloy material containing first, second and third elements selected from the group consisting of elements from the IIIa and Va columns of the Periodic Table, said second and third elements being selected from the same column and the proportions of said second and third elements being varied in the direction of growth of said ternary material, said process comprising the steps of:
  introducing a gaseous mixture of hydrogen and a halide of one of said second and third elements into a first zone at a first temperature to produce reactants;
  cooling said reactants by passage through a second zone maintained at room temperature;
  introducing said reactants into a third zone at a second temperature, said third zone containing a first source material of a compound consisting of said first element and one of said second and third elements;
  flowing said reactants through a fourth zone at a fourth temperature, said fourth zoine containing a second source material of a compound consisting of said first element;
  evaporating said first and second source materials and reacting same with said reactants; and
  depositing said ternary material onto said substrate in a fifth zone at a third temperature which is below said second temperature, and while introducing said gaseous mixture into said first zone, lowering said first temperature from a first level to a second level and raising said fourth temperature from a third level to a fourth level to effect a variation in the proportions of said reactants and said second source material thereby varying the proportions of said second and third elements in the direction of growth of said ternary material.

9. A process as claimed in claim 8, wherein said first level of sair first temperature is substantially 800° C., said second level of said first temperature is substantially 0° C., said second temperature is substantially 950° C., said third level of said fourth temperature is substantially 0° C., said fourth level of said fourth temperature is substantially 950° C., and said third temperature is substantially 800° C.

References Cited

UNITED STATES PATENTS

| 3,619,282 | 11/1971 | Manley et al. | 117—106 A |
| 3,619,283 | 11/1971 | Carpenter et al. | 117—201 |
| 3,594,242 | 7/1971 | Burd et al. | 117—106 A |
| 3,394,390 | 7/1968 | Cheney | 117—106 AX |
| 3,218,205 | 11/1965 | Ruehrwein | 117—106 AX |
| 3,145,125 | 8/1964 | Lyons | 117—106 AX |

ALFRED L. LEAVITT, Primary Examiner

M. F. ESPOSITO, Assistant Examiner

U.S. Cl. X.R.

117—201; 148—174, 175